April 14, 1959     T. H. CLORE ET AL     2,881,497

COUPLING FOR ANCHORING FLEXIBLE LINES

Filed Aug. 21, 1956

INVENTORS
THOMAS H. CLORE
WILLIS M. CARTER

BY    W. E. Sherwood

ATTORNEY

United States Patent Office 2,881,497
Patented Apr. 14, 1959

2,881,497

COUPLING FOR ANCHORING FLEXIBLE LINES

Thomas H. Clore and Willis M. Carter, Lexington, Ky., assignors to The Kentucky Research Foundation, Lexington, Ky., a corporation of Kentucky Application August 21, 1956, Serial No. 605,276

4 Claims. (Cl. 24—126)

This invention relates to an improved means for anchoring ropes, cables, straps, webbings and the like, hereinafter generally designated as lines, and particularly to an anchoring means for lines which are subjected to sudden tensions, as well as to sustained tensions. As the description proceeds, it will become apparent that the invention is not limited, however, to means for connecting a flexible line solely to a stationary structure, but, on the contrary, may be employed also in connecting the ends of a plurality of such lines to a common structure or an intermediate portion of a single line to such a structure.

An object of our invention is to provide an improved coupling means for anchoring lines which are subjected to substantial tension.

Another object is to provide an improved coupling means for anchoring lines without causing excessive wear on the line during repeated usage.

Another object is to provide an improved coupling means for anchoring lines while permitting use of a readily disconnectable structure.

A further object is to provide an improved coupling means for anchoring lines in a structure devoid of projecting parts susceptible to snagging of the line or its attachments. A still further object is to provide a light weight coupling means for anchoring lines.

These and additional objects and advantages will become more readily apparent by reference to the following description and the accompanying drawing wherein.

The present invention has special application to usage with parachutes although its advantageous features are in no way limited to that sole usage and in fact may be employed in any situation wherein a reliable anchoring means is needed. Taking the parachute usage as an example, a requirement exists for an anchoring means which may be readily connected to or disconnected from a load; which will infallibly function when subjected either to sudden tension or to sustained tension; which is relatively light in weight; and which presents no protruding portions which might foul a line or its attachments. We achieve these desirable features by the structure hereinafter described, although, as will be apparent to those skilled in the art, minor changes and modifications may be employed and we therefore contemplate by the appended claims to cover such modifications as fall within the true spirit and scope of our invention.

Figure 2:
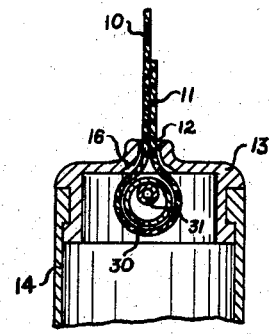
Fig. 2 is a sectional view taken on line 2—2 of Fig. 1 with the line in place and with tension removed therefrom.

Referring first to Fig. 2, a line 10 having its end 11 sewn or otherwise secured thereto to form a suitable loop, is threaded through an aperture 12 in cap member 13. For load distribution reasons we prefer to employ for the line a flat webbing or straps made of any suitable material, as for example nylon, but by suitable design of the structure a round rope can be employed. The cap preferably is cylindrical and is adapted to be connected to or disconnected from an anchoring housing 14, preferably of cylindrical configuration.

This housing may serve as a stationary mounting or may serve as the link between two such lines, in which event a similar cap member is provided at its second end. Preferably the maximum diameter of the cap corresponds to the maximum diameter of the housing as shown in Fig. 2.

Figure 1:
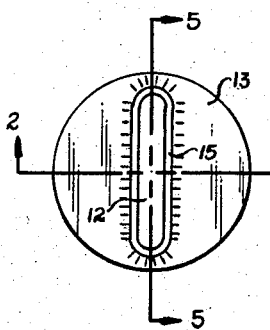
Fig. 1 is a top plan view of the cap member with the line removed.
Figure 3:
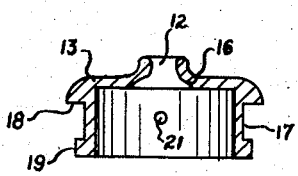
Fig. 3 is a sectional view of the cap member taken on the same diameter as Fig. 2 and with the anchor pin removed.
Figure 4:
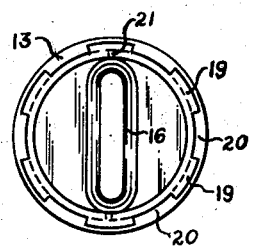
Fig. 4 is a bottom plan view of the cap member with the anchor pin removed.

Referring now to Figs. 1, 3 and 4, the cap is provided with a smooth external top surface sloping upwardly to a smooth, endless ridge 15 enclosing aperture 12. On its inner surface the cap has an elongated arcuate seating surface 16. When line contact of the anchoring pin upon the line 10 is sufficient, the seating surface may be convex in shape, but when area contact, which we prefer, is to be employed, the seating surface is concave and preferably is of the same curvature as that of the anchoring pin.

Various arrangements may be provided for joining the cap to the housing in a disconnectable manner. For example, straight or cam type splines, threaded connections, bayonet joints, or the like may be used. In one form which has been found satisfactory, the cap is provided with a groove 17 on its peripheral surface intermediate its top and bottom and with the groove defined by ledge 18 adapted to seat upon the upper edge of housing 14. A plurality of alternately spaced bosses 19 and recesses 20 are provided on the lower wall of the cap and with the thickness of the bosses being less than the thickness of ledge 18. At diametrically opposite sides the cap is provided with holes 21 extending through the wall into groove 17 and disposed on the main axis of aperture 12.

Housing 14 terminates in a flat edge and has a plurality of alternately spaced bosses 22 and recesses 23 extending inwardly. Diametrically spaced holes 24 are located in the wall of the housing. As will thus be seen, the cap may be assembled in a first position upon the housing simply by guiding its bosses 19 into recesses 23 of the housing and thereafter rotating the parts rotatively to a second position so that the upper edges of bosses 19 engage beneath the lower edges of bosses 22. By rotating the parts relatively in the opposite direction the cap and housing are disengaged.

Figure 5:
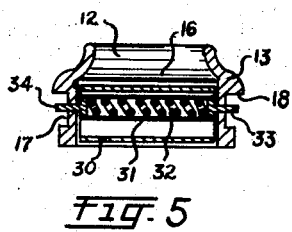
Fig. 5 is a detail view of the anchor pin in place within the cap, with the line removed, and taken on plane 5—5 of Fig. 1.
Figure 6:
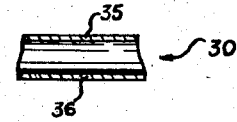
Fig. 6 is a sectional view taken longitudinally of the anchor pin.
Figure 7:
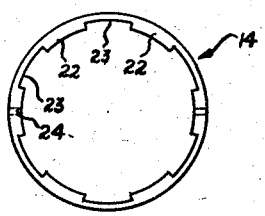
Fig. 7 is a top plan view of the anchoring housing showing one form of a connecting arrangement.

As a significant part of our invention, an anchoring pin 30 is loosely mounted in the cap and is enveloped throughout a substantial part of its length by the loop of line 10. For the purpose of retaining the pin in place within the cap, a suitable means, such as retaining pin 31, best seen in Fig. 5, may be used. Preferably, the anchoring pin is in the form of a hollow cylinder and the retaining pin is of substantially smaller diameter than the inner diameter of the anchoring pin. During the application of tension to line 10 no stress is placed upon the retaining pin and it accordingly is of light construction, which conveniently may consist of a hollow cylinder containing a compression spring 32 bearing upon two pin locks 33 and 34 mounted in the holes 21 of the cap. When assembling the structure, the pin locks are depressed and upon relative rotation of the cap and housing to the second position, thereupon engage in holes 24 of the housing to lock the parts securely together. As noted, the extreme end of the pin locks do not extend beyond the edge of ledge 18, and thus do not protrude from the surface of the assembled structure. Moreover, due to its flexible nature, the line is unable by twisting to exert sufficient torque to place any appreciable shear load on parts of the retaining pin.

Anchoring pin 30 is relatively large in diameter and provides a substantial surface against which the back of the looped line may pull. When using a cylindrical shaped cap, we prefer to make the side 35 of the pin which contacts seating surface 16 with a smaller length than the rear side 36 thereof which contacts the back of the loop. In this way any tendency of the anchoring pin to seat non-uniformly is obviated.

With the above description in mind, Fig. 2 will be seen to indicate the assembled structure without tension in line 10. Assuming the invention in use upon a parachute connected to line 10; upon receiving the sudden tension at the time of parachute opening, the back part of the loop instantly pulls anchoring pin 30 upwardly, compressing a portion of the upper loop between the arcuate seating surface 16 and the top side 35 of the pin. During this action the curved surface of the pin accommodates itself to the seating surface 16 and provides a substantially uniform clamping action which does not fray or wear the line material. The total stress moreover, is distributed lengthwise of the cylindrical anchoring pin as well as circumferentially thereof so that in effect a compression of a hoop section is involved with its well known high resistance to load. No bending of the anchoring pin therefore occurs, as might be the case were the pin secured rigidly at its ends to the cap.

Moreover, by employing a hollow anchoring pin using the advantages of hoop compressive stresses, a lighter weight structure is secured for a given maximum tension loading in the line.

It has been found that light weight materials, such as aluminum for example, may be employed for all parts of the structure excepting perhaps spring 32. The several parts may be fabricated by casting, powder metallurgy, machining, or otherwise, as desired. All external parts of the structure provide smooth lines which remove the possibility of fouling any associated equipment. Moreover, a pleasing ornamental structure is secured which further lends the invention to a variety of uses.

The advantages of the structure constructed in accordance with our invention will be readily perceived and although a preferred embodiment is herein illustrated, it is to be understood that changes in the details of construction and arrangement of parts may be made which will fall within the scope of the invention as claimed.

What we claim as our invention is:

1. A coupling for anchoring flexible lines comprising in combination, an anchoring housing, a cap member removably attached to said housing, said cap member having an aperture therein for receiving the looped part of a line, a seating surface on the interior of said cap, an anchoring pin supported within said cap for movement toward and from said seating surfaces and around which the looped part of said line is engaged, and means loosely mounting the anchoring pin within said cap and having an adjustable end portion projecting through said cap and engageable with said housing thereby to releasably fasten said cap member to said housing, said mounting means being separate from said anchoring pin and free from tension applied to said line.

2. A coupling for anchoring flexible lines comprising in combination, an anchoring housing, a cap member removably attached to said housing, said cap member having an aperture therein for receiving the looped part of a line, an arcuate seating surface on the interior of said cap, an arcuate anchoring pin supported within said cap for movement toward and from said seating surface and around which the looped part of said line is engaged, said pin serving to compress said line against the seating surface when tension is applied to said line, and means loosely mounting the anchoring pin within said cap and having an adjustable end portion projecting through said cap and engageable with said housing thereby to releasably fasten said cap member to said housing, said mounting means being separate from said anchoring pin and free from tension applied to said line.

3. A coupling for anchoring flexible lines comprising in combination, an anchoring housing, a cap member removably attached to said housing, said cap member having an elongated aperture therein for receiving the looped part of a flat line, a seating surface on the interior of said cap, an elongated, hollow cylindrical anchoring pin supported within said cap for movement toward and from said seating surface and around which the looped part of said line is engaged, said anchoring pin serving to compress said line against the seating surface when tension is applied to said line and to resist said tension by hoop compression of the pin wall, and means loosely mounting the anchoring pin within said cap and having an adjustable end portion projecting through said cap and engageable with said housing thereby to releasably fasten said cap member to said housing, said mounting means being mounted within the anchoring pin separately therefrom and free from tension applied to said line.

4. A coupling for anchoring flexible lines comprising in combination, an anchoring housing having means for detachably securing a cap member thereto, a cap member having means for engaging with said housing cap securing means and movable from a first disengaged position to a second engaged position, said cap member having an aperture therein for receiving the looped part of a line and having a seating surface on the interior of said cap member, an anchoring pin supported within said cap for movement toward and from said seating surface and around which the looped part of said line is engaged, and means loosely mounting the anchoring pin in said cap, said mounting means being separated from said anchoring pin and having a locking member for locking said cap to said housing in said second engaged position.

References Cited in the file of this patent

UNITED STATES PATENTS

| | | |
|---|---|---|
| 429,212 | Gardner | June 3, 1890 |
| 788,488 | Miller | Apr. 25, 1905 |
| 793,751 | Sykes | July 4, 1905 |
| 1,269,508 | Province | June 11, 1918 |
| 1,313,644 | Simon | Aug. 19, 1919 |
| 1,315,969 | Kienzle | Sept. 16, 1919 |
| 2,477,877 | Jeffrey | Aug. 2, 1949 |
| 2,572,516 | Randolph | Oct. 23, 1951 |

FOREIGN PATENTS

| | | |
|---|---|---|
| 316,338 | Italy | Apr. 4, 1934 |